United States Patent
Banerjee et al.

(10) Patent No.: US 7,050,171 B1
(45) Date of Patent: May 23, 2006

(54) SINGLE-EXPOSURE INTERFEROMETER WITH NO MOVING PARTS

(75) Inventors: Ajit Banerjee, Bel Air, MD (US); James O. Jensen, Bel Air, MD (US); William R. Loerop, Aberdeen, MD (US); Clifton N. Merrow, Rolla, MO (US)

(73) Assignee: The United States of America as represneted by the Secretary of the Army, Washington, DC (US)

( * ) Notice: Subject to any disclaimer, the term of this patent is extended or adjusted under 35 U.S.C. 154(b) by 217 days.

(21) Appl. No.: 10/701,408

(22) Filed: Nov. 3, 2003

Related U.S. Application Data

(60) Provisional application No. 60/423,474, filed on Nov. 4, 2002.

(51) Int. Cl.
*G01B 9/02* (2006.01)
*G01B 11/02* (2006.01)

(52) U.S. Cl. ............... 356/450; 356/498; 359/834

(58) Field of Classification Search ................ 356/498, 356/503, 504, 511, 516, 450; 359/618, 634, 359/833, 834
See application file for complete search history.

(56) References Cited

U.S. PATENT DOCUMENTS

| | | | | |
|---|---|---|---|---|
| 3,127,465 A | * | 3/1964 | Stephens | ............... 356/498 |
| 4,309,109 A | * | 1/1982 | Blodgett et al. | ............ 356/506 |

* cited by examiner

*Primary Examiner*—Gregory J. Toatley
*Assistant Examiner*—Marissa J Detschel
(74) *Attorney, Agent, or Firm*—Ulysses John Biffoni

(57) ABSTRACT

A interferometer that has no moving parts and can acquire an interferogram in a single exposure is disclosed. Embodiments according to the invention can be used for polychromatic and/or monochromatic detection and include a fixed-position element that divides a beam segment into a plurality of parallel sub-beams of successively increasing path lengths. Embodiments according to the invention can be constructed from separate elements or can be combined into a one-piece device to provide increased stability and ruggedness.

4 Claims, 7 Drawing Sheets

SINGLE-EXPOSURE INTERFEROMETER WITH NO MOVING PARTS

CROSS-REFERENCE TO RELATED APPLICATIONS

This application claims benefit of U.S. Provisional application No. 60/423,474, filed Nov. 4, 2002.

GOVERNMENT INTEREST

The invention described herein may be manufactured, licensed, and used by or for the U.S. Government.

TECHNICAL FIELD

The present invention relates generally to interferometry and in particular to interferometers capable of single-exposure, no moving parts, non-scanning, polychromatic interferometery.

BACKGROUND

Conventional devices for producing interferograms have one or more moving parts, such as a mirror or other reflective element, and accumulate data from several measurements of electromagnetic radiation at a succession of different mirror positions. These devices are usually variants of the Michelson interferometer design, and the interferograms are recorded for a number of different positions of the moving mirror and analyzed for spectral content. The distance between mirror positions can be very small. For example, optical interferometry mirror movements can be 1 millionth of a meter or less. A high precision mechanism is therefore required to reposition the mirror and maintain its reflective surface in a plane that is normal to the direction of propagation of the sample input beam. Although construction of a Michelson-type interferometer is a major optomechanical challenge and good instruments can be quite expensive, the Michelson interferometer remains the most widely used instrument of its kind, and over the years, many variations have been designed. In particular, substantial effort has been devoted to the design of staging platforms, actuators, transducers, drive mechanisms, and the like, to improve positioning and control of the moving mirror.

Michelson-type interferometers are subject to misalignment and distortion from vibration, shock and environmental changes and must be field hardened for use outside a laboratory environment. For example, the Michelson-type interferometer in the Army's M21 Automatic Chemical Agent Alarm is housed in an elaborate and costly vibration isolating, climate controlled enclosure. Michelson-type interferometers may also experience problems in applications where the input signal changes rapidly during the time the mirror takes to travel the distance needed for acquiring a complete interferogram. For example, an interferometer that is operating from a fast moving platform such as an airplane with a given field-of-view (FOV) can experience an input signal that changes more rapidly than the acquisition time of a complete interferogram. In this case, the "scene" or region of space being sampled within the instrument's FOV is not constant over the acquisition time, and the interferogram is thus composed of a mixture of data from several different scenes.

These and other problems are solved, at least in part, by embodiments of a single-exposure, no moving parts interferometer in accordance with the present invention.

SUMMARY

In general, in one aspect, an embodiment of an interferometer in accordance with the present invention includes a source of electromagnetic energy directed along an initial beam path, a detector of electromagnetic energy, a beam splitter configured to split the beam of electromagnetic energy into segments including a reflected beam segment and a transmitted beam segment, a first reflective element fixed in position and configured to reflect the reflected beam segment back along a beam path normal to the initial beam path and through the beam splitter to the detector, a second reflective element fixed in position and configured to reflect the transmitted beam segment back in a direction parallel to the initial beam path in a plurality of sub-beams so that each of the plurality of sub-beams traverses a path that differs incrementally in phase from the path traversed by an adjacent sub-beam, whereupon the subbeams are combined interferometrically at the beam splitter with the beam segment reflected from the first reflective element to produce an interferogram at the detector.

In general, in another aspect, a method of interferometry in accordance with the present invention includes directing an input electromagnetic beam along an initial beam path, splitting the input electromagnetic beam with a beam splitter that provides a plurality of beam segments comprising a first beam segment directed along a beam path normal to the initial beam path and a second beam segment directed along a beam path parallel to the initial beam path, reflecting the first beam segment back along the beam path normal to the first electromagnetic beam and traversing the beam splitter to a detector, reflecting the second beam segment back along a beam path parallel to the initial beam path in a plurality of parallel sub-beams of successively increasing path lengths, reflecting the plurality of parallel sub-beams at the beam splitter along the beam path normal to the first electromagnetic beam, and detecting an interferometric relationship between the plurality of sub-beams of successively increasing path lengths and the first beam segment.

In general, in another aspect, an embodiment of an interferometer in accordance with the present invention includes a first prism that includes an input face normal to an input optical path, a reflective face normal to the input face, and a beamsplitter face opposite the input face and oriented at an acute angle with respect to the input optical path. In another aspect, the embodiment of an interferometer in accordance with the present invention further includes a second prism disposed with a beamsplitter face parallel and adjacent to the beamsplitter face of the first prism. The second prism further includes an output face normal to the input optical path and opposite the reflective face of the first prism, and a reflective face that includes a plurality of parallel reflective surfaces normal to the input optical path and configured to provide successively increasing path lengths in a direction parallel to the input optical path.

DETAILED DESCRIPTION

In the following detailed description, reference is made to the accompanying drawing that forms a part hereof, and in which is shown by way of illustration a specific embodiment in which the invention, as claimed, may be practiced. This invention may, however, be embodied in many different forms and should not be construed as limited to the embodiments set forth; rather, these embodiments are provided so that this disclosure will be thorough and complete, and will fully convey the scope of the invention to those skilled in the art. For example, while embodiments in accordance with the invention include optical interferometers employing optical elements such as optical mirrors, beamsplitters, and the like, as will be appreciated by those of skill in the art, embodiments in accordance with the invention also include interferometers for detecting and analyzing other ranges of the electromagnetic spectrum, including radio frequency, infrared, middle-infrared, ultraviolet, x-ray, and beyond.

Figure 1:
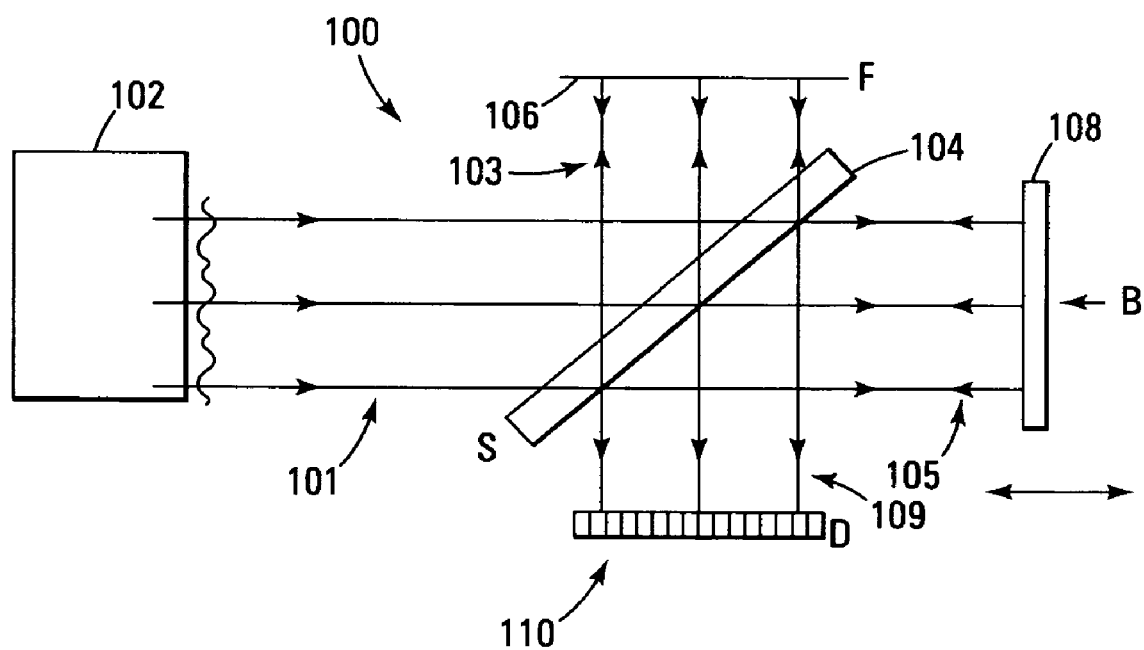
FIG. 1 is a schematic representation of a conventional step-scan Michelson interferometer system.

FIG. 1 shows a simplified schematic diagram illustrating the operation of a step-scan Michelson interferometer 100 with a multi-element detector array 110. An input beam 101, typically collimated, from an electromagnetic radiation source 102 is amplitude split using a beamsplitter 104. A reflected beam segment 103 of the input beam 101 propagates upward from beamsplitter 104 and is reflected back by a fixed position mirror 106 that is normal to the direction of propagation of beam segment 103. A transmitted segment 105 of the input beam 101 passes through beamsplitter 104 and propagates to the right and is reflected back by a movable mirror 108 that is normal to the direction of propagation of transmitted segment 105. Both segments 103 and 105 are retro-reflected coincident with their respective incident paths and upon arriving back at beamsplitter 104 the beam segments are allowed to recombine. The resulting recombined beam 109 propagates to the multi-element n×n array detector 110 such as a charge coupled device, where it is converted to a signal for analysis and monitoring.

The signal output by detector 110 is a function of the path difference between the fixed mirror 106 and moveable mirror 108. At a zero path difference the waves for all electromagnetic frequencies of the input beam will interact coherently. As the movable mirror 108 is scanned, each input wavelength will generate a series of transmission maxima.

In a conventional interferometer, path difference is adjusted by displacing an optical element in the path of one beam segment. For example, in the interferometer of FIG. 1, moving mirror 108 of FIG. 1 is moved back and forth along the path of transmitted beam segment 105 by a transport mechanism such as a staging platform, actuator, transducer, stepper motor or similar drive mechanism. Each displacement of moving mirror 108 corresponds to a twofold increase or decrease in the path difference between the transmitted beam segment 105 and the reflected beam segment 103.

Input beam 101 in the simplest case, is monochromatic collimated light. The intensity of the recombined beam 109 depends on the path difference traveled by the two beam segments 103 and 105. If the distance traveled by the two beam segments 103 and 105 is the same, or if the paths differ by an integer multiple of the wavelength of input beam 101, the beam segments will be in phase when they recombine at beamsplitter 104, and the intensity of the superposition of the two beams at detector 110 will be at a maximum. Displacing the moving mirror 108 changes the phase relationship of the beams being recombined. This phase difference results in an observable loss of amplitude in the recombined beam 109 relative to the input beam 101. Recording the changes in amplitude as the position of the moving mirror 108 is varied yields an interferogram which may then be analyzed to determine spectral content. An interferogram produced by interferometer 100 is thus composed of the intensity of the superposition of the two beams at detector 110 for each of the moving mirror 108 positions. Monochromatic light will have a single series of transmission maxima. Polychromatic light or other multiple frequency electromagnetic sources will have a different series of transmission maxima for each input wavelength present.

The number of displacements or steps of moving mirror 108 corresponds to the number of data points at the detector 110. In general, in order to resolve shorter input wavelengths, smaller and increasingly precise mirror movements are needed.

Figure 2:
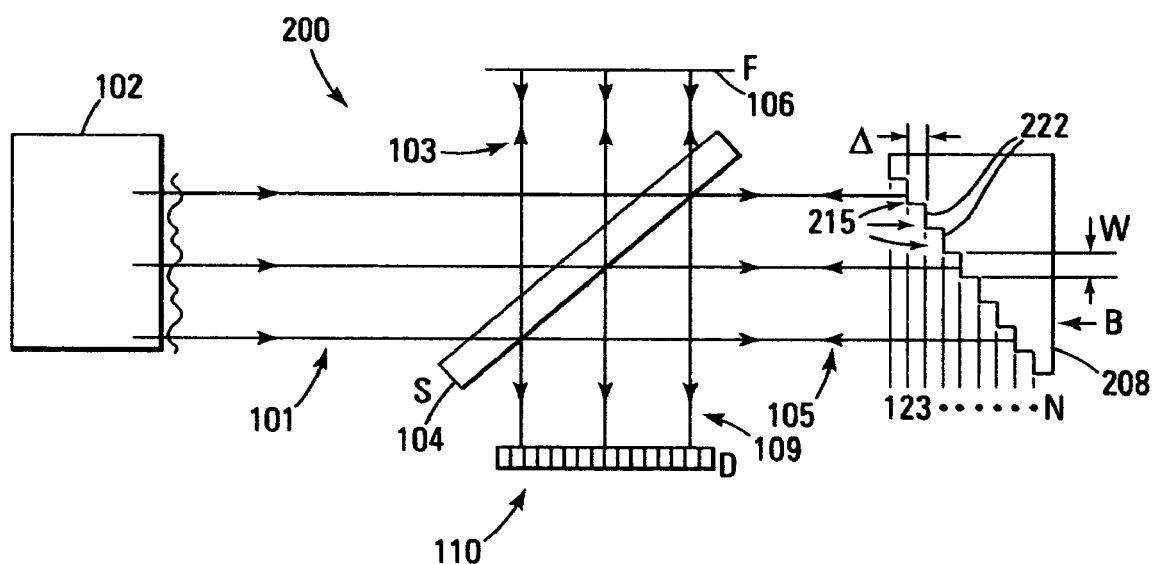
FIG. 2 is a schematic representation of a system according to an embodiment of the present invention.

Referring now to FIG. 2, an interferometer 200 in accordance with the present invention includes an electromagnetic radiation source 102, preferably collimated, an optical beamsplitter 104, a fixed position reflector 106 and a detector 110. The foregoing elements perform like functions as like numbered elements of the conventional interferometer 100 of FIG. 1. Interferometer 200 however replaces the moving mirror 108 of FIG. 1 with a fixed position reflective element that advantageously transforms an incident beam into a series of parallel reflections of successively increasing path lengths. Because the reflective element is not moving the parallel reflections are provided continuously and essentially simultaneously.

The embodiment of FIG. 2 employs a staircase reflector 208 that provides a series of N reflective elements 215 having planar reflective surfaces 222 of width W normal to the direction of propagation of beam segment 105. The reflective surfaces 222 are spaced from neighboring reflective elements by a distance $\Delta$ in the direction of propagation of beam segment 105 so that the path length traversed by sub-beams reflected from successive reflective surfaces 222 of staircase reflector 208 are incremented by $2\Delta$.

With the staircase reflector 208 in place, the cross-section (width) of transmitted beam segment 105 can be considered to be made of a series of smaller width sub-beams. Each of the sub-beams can be made to traverse successively increasing path lengths by retro-reflecting them on the stepped reflective surfaces 122 of the staircase reflector 208. Of course, each of these sub-beams must be superposed on a corresponding section from the unaltered beam retroreflected from reflector 106.

Thus, with staircase reflector 208, a complete interferogram can be produced spatially at detector 110. Because all the different relative phase differences between the two beam segments 103 and 105 are present at the same time, the scanning of an optical element such as a mirror is no longer required to acquire the interferogram.

Figure 3:
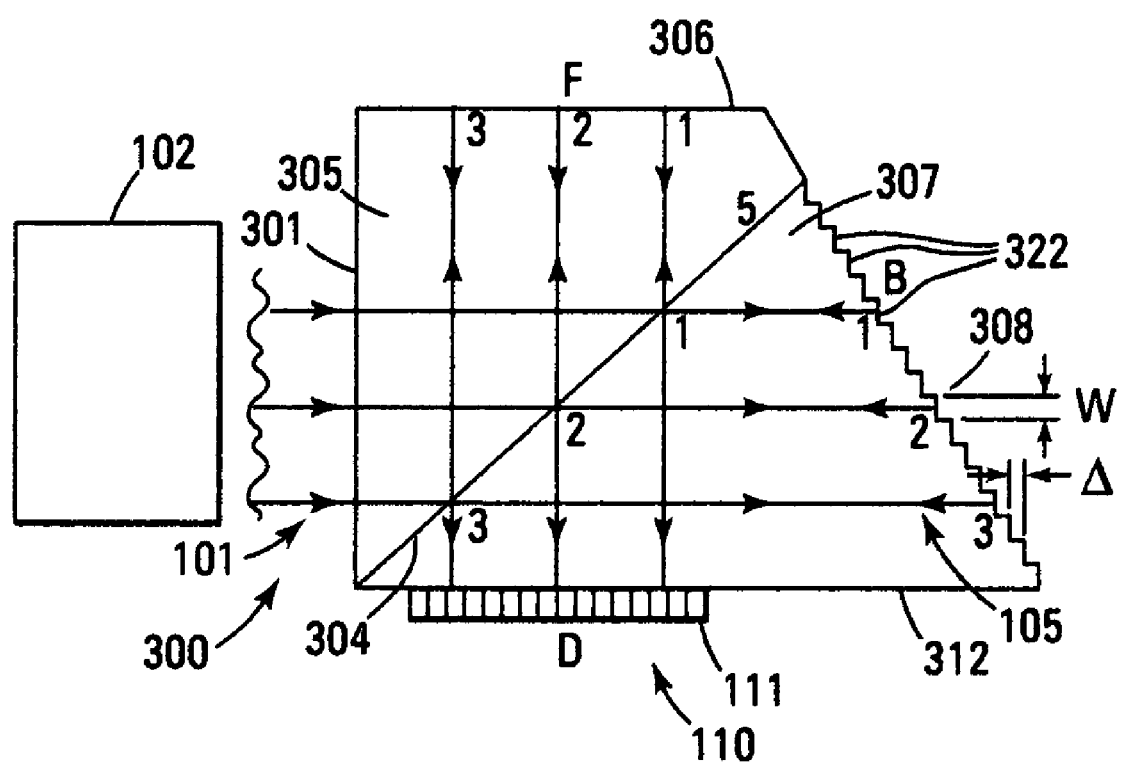
FIG. 3 is a representation of an interferometer according to an embodiment of the present invention.

Referring to FIG. 3, a one-piece, no moving parts, polychromatic interferometer 300 in accordance with the present invention is shown. Interferometer 300 is rugged and capable of acquiring an interferogram in one exposure. It includes two prisms 305 and 307, that are fused or "sandwiched" into a beamsplitter 304. For infrared applications, the prisms of interferometer 300 may be constructed of zinc selenide (ZnSe), germanium (Ge), or other infrared transmitting material. Visible light applications will most likely use high quality quartz, BK7 glass or other similar visible light transmitting material. The top surface 306 of prism 305 includes a planar mirrored surface that is normal to the direction of propagation of incident beam 101 and functions as a fixed mirror of the interferometer 300 in a manner similar to the fixed reflector 106 of the interferometer 100 of FIG. 1. A staircase reflector 308 is provided on or adjacent to the surface of the second prism 307 opposite beamsplitter 304 and replaces the moving mirror 108 of the interferometer 100 of FIG. 1. Staircase reflector 308 includes a series of N equally sized planar reflective elements 322 of width W that are separated from neighboring reflective elements in a direction parallel to the direction of propagation of beam segment 105 by a distance Δ. Staircase reflector 308 may be blazed or micromachined into the surface of the second prism 307 or made from a suitable diffraction grating affixed to the surface.

The number of reflective "steps" provided by a staircase reflector according to the present invention will, in general, determine the number of sub-beams of successively increasing path lengths, and hence, the maximum number of data points in the interferogram. This is essentially equivalent to setting the number of data points taken along the path of the moving mirror 106 in the conventional step-scan Michelson interferometer 100. By increasing the number of staircase reflector steps and the distance spanned by the steps along the beam path, the resolution of an interferometer in accordance with the present invention may be increased.

In general, the resolution and frequency range that can be detected by an interferometer is affected by the overall path difference between the transmitted and reflected beams. The larger this difference, the better the resolution and the wider the frequency range. Referring to FIG. 2, the measure of the path differences for beam segments 103 and 105, is $(S_i B_i - S_i F_i)$, i=I,N, where the $S_i B_i$ is the distance from beamsplitter 104 to the $i^{th}$ step of staircase reflector 208 and $S_i F_i$ is the vertical distance between the beamsplitter 104 and the fixed reflector 106.

The overall sensitivity of an interferometer in accordance with the present invention will be dependent on several factors. Quantum yield and noise characteristics of the detector, typically a focal plane array camera, are important considerations. In order for the detector to produce a suitable electronic signal above the background noise, a sufficient number of photons must strike the detector during the allotted exposure time.

Another factor affecting sensitivity and resolution is the degree of match in size between the widths of the sub-beams and the detector elements. For example, if the width W of the steps of staircase reflector 308 is larger than the width of the detector elements 111 in the detector 110, the intensity from a single path difference can spill over into the adjacent detector support framework and possibly even other detector elements. This can result is a loss in the number of photons detected and a cross-contamination of signals derived from different phases or path lengths. Thus, it is desirable to match as much as possible the widths of the subdivided beams to detector element widths or the widths of groups of adjacent detector elements.

A variety of techniques may be used to produce a staircase reflector for embodiments of interferometers in accordance with the present invention. In a preferred embodiment, a suitable staircase reflector can be made by employing manufacturing techniques similar to techniques used in the production of planar reflection gratings. For example, a planar reflection grating that is "blazed" or ruled in a sawtooth pattern can be oriented to provide a staircase of planar reflective surfaces normal to and incrementally distant from an incident beam.

Figure 4A:
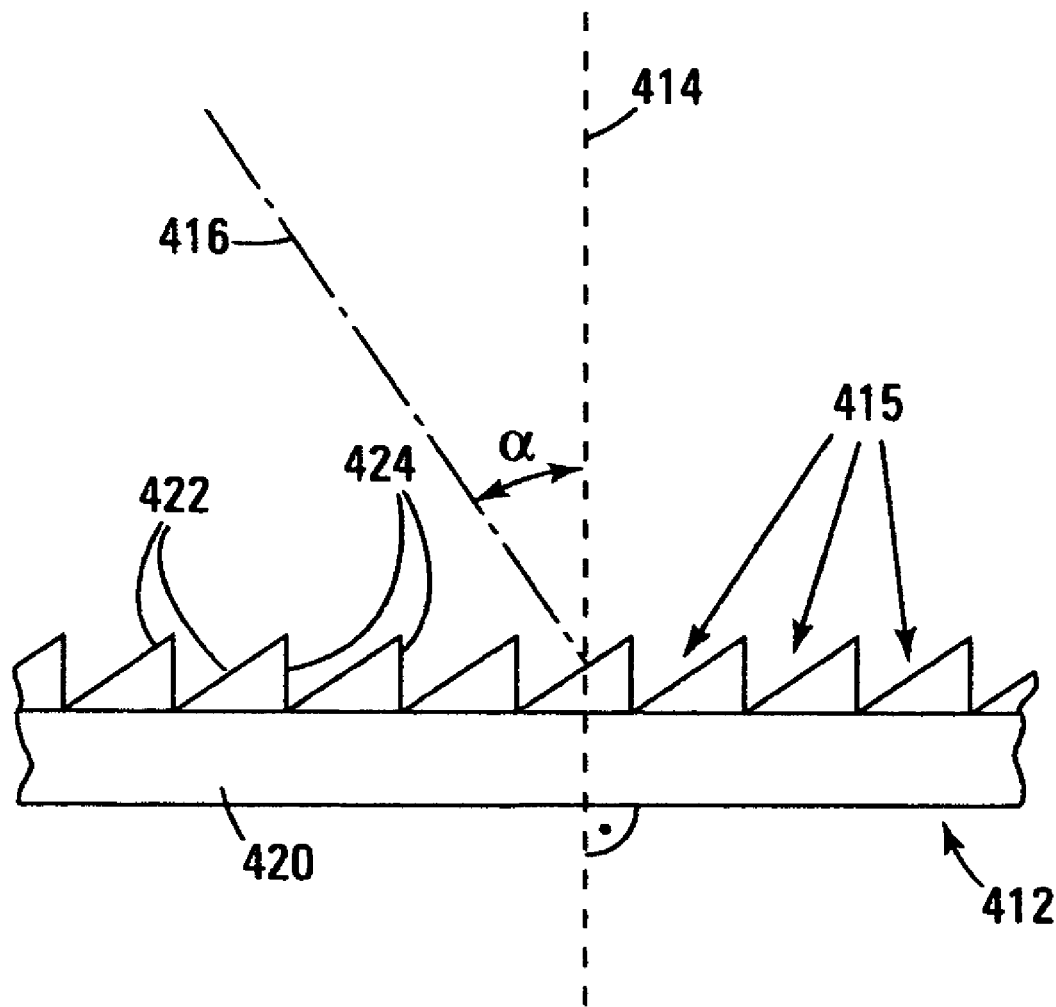
FIG. 4A shows a profile view of a sawtooth blazed reflection grating.

FIG. 4A shows a profile view of a sawtooth blazed reflection grating 412. The grating 412, is formed on a planar substrate 420, and has evenly spaced grooves 415 in a sawtooth pattern as seen in profile. Each grating groove 415 has a reflection surface 422 having a surface normal 416 oriented at a "blaze" angle α with the surface normal 414 of the underlying substrate 420. In addition, each grating groove 415 includes a second surface 424 that is located adjacent to the reflection surface 422.

Figure 4B:
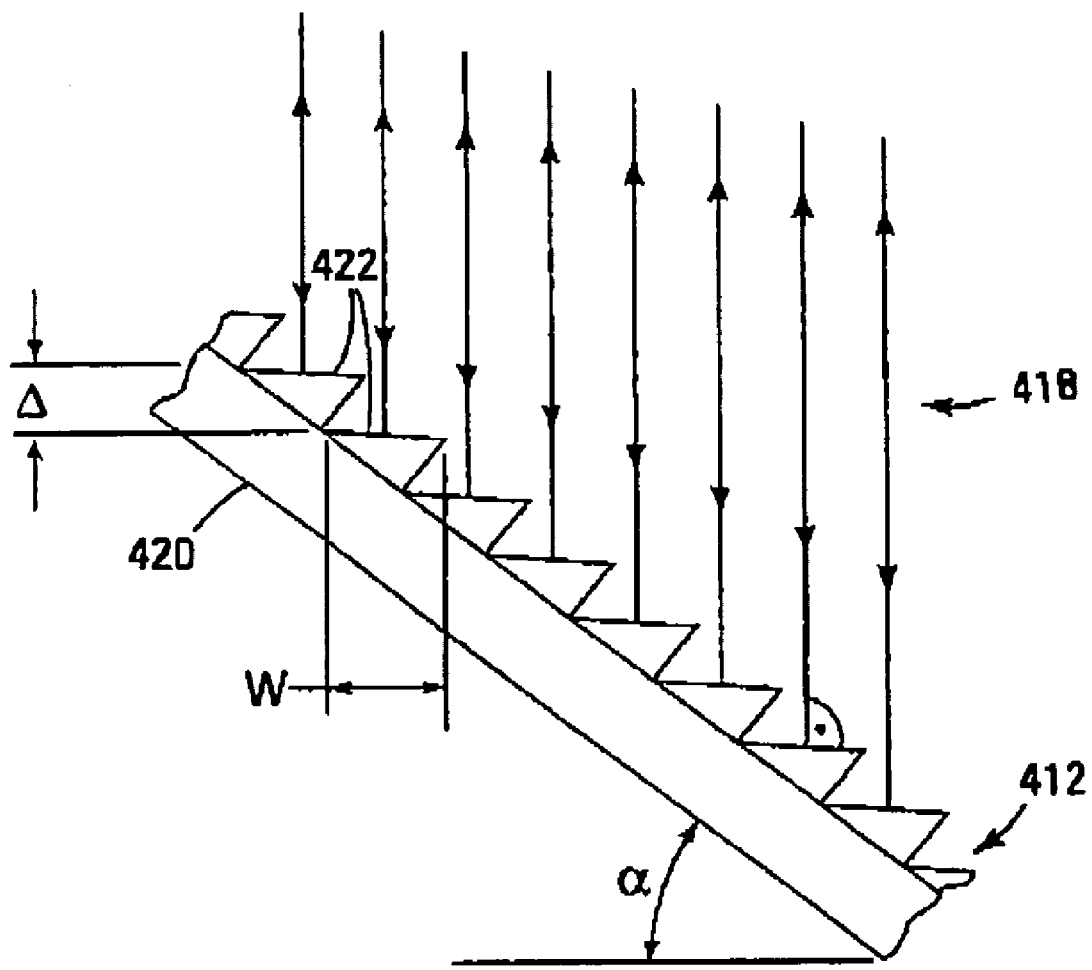
FIG. 4B shows a profile view of a sawtooth blazed reflection grating configured to provide a staircase reflector according to an embodiment of the present invention.

FIG. 4B shows a profile view of the sawtooth blazed reflection grating 412 of FIG. 4A with substrate 420 oriented at an angle α with respect to the plane normal to incident beam 418. With substrate 420 so oriented, reflection surfaces 422 provide a staircase of planar reflective surfaces normal to the incident beam 318 and separated along the axis of the beam by a step size Δ.

Figure 5:
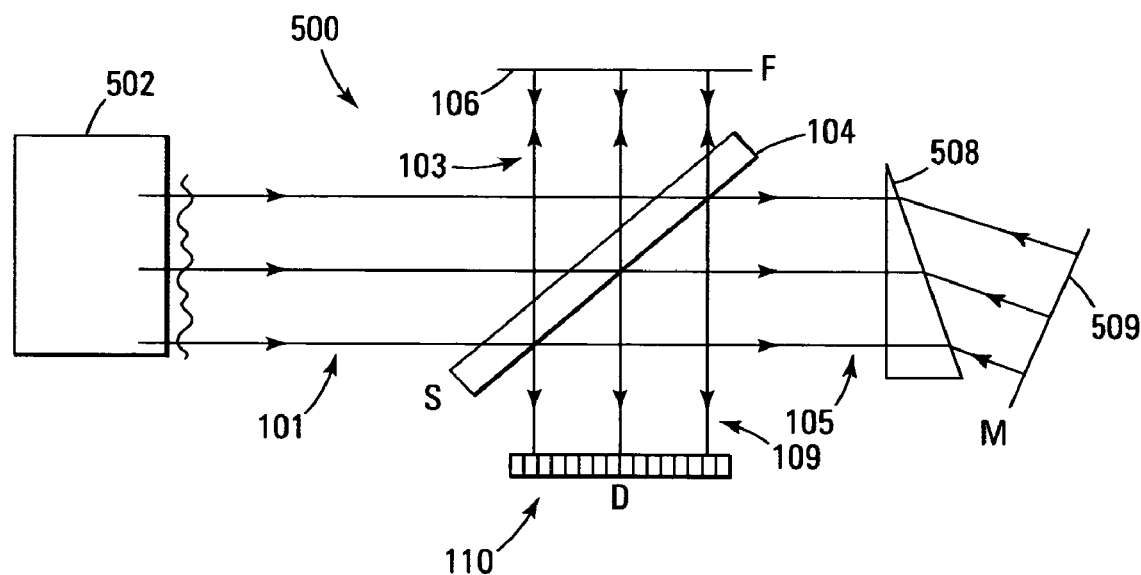
FIG. 5 is a representation of a monochromatic interferometer according to an embodiment of the present invention.

FIG. 5 shows a diagram of an alternative embodiment of an interferometer in accordance with the present invention. In contrast to the embodiments that have been described above, interferometer 500 is suitable only for analysis of monochromatic light. Interferometer 500 includes a monochromatic light source 502, such as a laser, an optical beamsplitter 104, a fixed position mirror 106 and a detector 110. An optical wedge 508 and a planar mirror 509 behind it (which may be a mirrored surface of wedge 508) are used in place of the moving mirror of the conventional Michelson interferometer. The wedge 508 is made of an optical material with an index of refraction much greater than air (or other surrounding media), and thus imposes a phase "lag" as a beam traverses through it. As shown in FIG. 5, the wedge 508 is somewhat thinner at the top relative to the bottom. Thus, as the thickness of wedge 508 increases, so does the phase difference in beam segment 105 and corresponding path differences between beam segments 103 and 105 are effected. Planar mirror 509 is oriented at an angle such that retro-reflections exiting optical wedge 508 are parallel to the direction of propagation of the incident beam.

A prototype that illustrates, at least in part, the operation of an interferometer in accordance with the present invention was constructed of general research grade optical components in a laboratory. The interferometer was constructed on several precision motion stages, and employed two 2" diameter fixed position planar aluminum mirrors with ¹⁄₁₀ wave surfaces, a cube beamsplitter antireflected coated for 400–800 nm, and a green 0.5 mW HeNe laser operating at 534 nm which was beam expanded to approximately 20 nm. In this prototype the staircase reflector element was approximated by angling one of the fixed position planar mirrors so that reflections across the face of the mirror occurred at incremental path distances.

Figure 6:
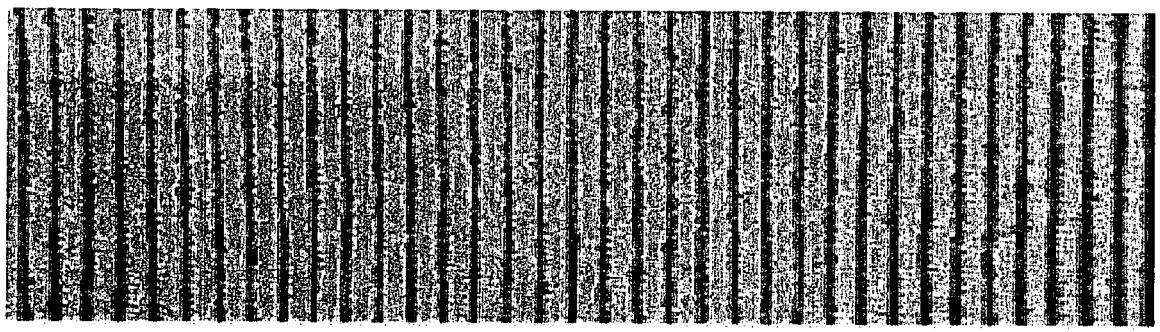
FIG. 6 is an image of an interferogram recorded with an embodiment of a monochromatic interferometer according to the present invention.

Shown in FIG. 6 is an image of an interferogram recorded with the aforementioned prototype interferometer according to the present invention. The interferogram was recorded using a monochromatic green HeNe laser source. For ease of viewing, the angle of the mirror was set so that only a few fringes of the interferogram 500 would be produced over the entire width of the beam. These fringes are easily observed and the intensity variations are representative of the expected sinusoidal wave.

CONCLUSION

As has been shown, embodiments in accordance with the present invention include an interferometer/sensor that has no moving parts, can be constructed as a single solid element, and is able to acquire an interferogram in a single exposure using a focal plane array detector. Such interferometers are stable, rugged, relatively inexpensive to construct, and are expected to be less susceptible to mechanical failures than conventional step-scan Michelson interferometer designs. A number of embodiments of the invention defined by the following claims have been described. Nevertheless, it will be understood that various modifications to the described embodiments may be made without departing from the spirit and scope of the claimed invention. For example, although some embodiments of the present invention have been illustrated in terms of optical interferometry, those of ordinary skill in the art will readily appreciate that embodiments in accordance with the present invention will include interferometers for detecting and analyzing other ranges of the electromagnetic spectrum, including radio frequency, infrared, middle-infrared, ultraviolet, x-ray, and beyond. Accordingly, other embodiments are within the scope of the invention, which is limited only by the following claims.

REFERENCES

1. M. J. Persky, Rev. Sci. Instrum. 66(10), 1995, 4763; and the references therein.
2. S. F. Johnston, "Fourier Transform Infrared, A constantly Evolving Technology", Ellis Horwood, New York, 1991; and the references therein.

What is claimed is:

1. An interferometer, comprising:
   a first prism that includes:
     an input face normal to an input optical path,
     a reflective face normal to the input face; and
     a beam splitter face opposite the input face and oriented at an acute angle with respect to the input optical path;
   a second prism disposed with a beamsplitter face parallel and adjacent to the beamsplitter face of the first prism wherein the second prism further includes:
     an output face parallel to the input optical path and opposite the reflective face of the first prism, and
     a reflective face comprising a plurality of parallel reflective surfaces normal to the input optical path and configured to provide successively increasing path lengths in a direction parallel to the input optical path.

2. The interferometer of claim 1, further comprising a detector comprising an array of detector elements to detect light emitted from the output face.

3. The interferometer of claim 2, wherein there is a mapping between one or more detector elements and parallel reflective surfaces of the reflective face of the second prism to avoid cross-contamination of signals derived from different sub-beams.

4. The interferometer of claim 1, wherein the reflective face of the second prism comprising a plurality of parallel reflective surfaces normal to the input optical path and configured to provide successively increasing path lengths comprises a staircase reflector.

* * * * *